United States Patent
May et al.

(10) Patent No.: US 9,596,339 B2
(45) Date of Patent: *Mar. 14, 2017

(54) COMMUNICATIONS SYSTEM PROVIDING AUTOMATIC TEXT-TO-SPEECH CONVERSION FEATURES AND RELATED METHODS

(71) Applicant: BlackBerry Limited, Waterloo (CA)

(72) Inventors: Darrell Reginald May, Waterloo (CA); Alain R. Gagne, Cambridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,867

(22) Filed: Dec. 7, 2015

(65) Prior Publication Data

US 2016/0094706 A1    Mar. 31, 2016

Related U.S. Application Data

(63) Continuation of application No. 14/255,345, filed on Apr. 17, 2014, now Pat. No. 9,237,219, which is a (Continued)

(51) Int. Cl.
*H04M 1/725* (2006.01)
*H04W 4/14* (2009.01)
(Continued)

(52) U.S. Cl.
CPC ......... *H04M 1/72563* (2013.01); *G10L 13/00* (2013.01); *H04M 1/6066* (2013.01); (Continued)

(58) Field of Classification Search
CPC ........... H04M 1/72563; H04M 1/6066; H04M 1/7255; H04M 1/72552; H04W 4/14; H04W 88/06; H04W 4/16; G10L 13/00
(Continued)

(56) References Cited

U.S. PATENT DOCUMENTS

| 4,682,368 A | 7/1987 | Takahashi .................... 340/7.21 |
| 4,868,888 A | 9/1989 | Dayton ...................... 455/575.1 |

(Continued)

FOREIGN PATENT DOCUMENTS

| EP | 0901000 | 3/1999 | ............. G01C 21/20 |
| EP | 1113416 | 7/2001 | ............. G10L 13/02 |

(Continued)

OTHER PUBLICATIONS

Ssi, "Wireless Text to Speech Conversion", 2002. Available at www.wireless-message.com/wireless_text_speech.htm, pp. 1-4.
(Continued)

*Primary Examiner* — Sharad Rampuria
(74) *Attorney, Agent, or Firm* — Donna Flores; Fleit Gibbons Gutman Bongini & Bianco P.L.

(57) ABSTRACT

A communications system may include at least one mobile wireless communications device, and a wireless communications network for sending text messages thereto. More particularly, the at least one mobile wireless communications device may include a wireless transceiver and a controller for cooperating therewith for receiving text messages from the wireless communications network. It may further include a headset output connected to the controller. The controller may be for switching between a normal message mode and an audio message mode based upon a connection between the headset output and a headset. Moreover, when in the audio message mode, the controller may output at least one audio message including speech generated from at least one of the received text messages via the headset output.

20 Claims, 6 Drawing Sheets

Related U.S. Application Data continuation of application No. 14/047,482, filed on Oct. 7, 2013, now Pat. No. 8,731,531, which is a continuation of application No. 13/493,538, filed on Jun. 11, 2012, now Pat. No. 8,554,254, which is a continuation of application No. 13/304,788, filed on Nov. 28, 2011, now Pat. No. 8,200,295, which is a continuation of application No. 13/081,753, filed on Apr. 7, 2011, now Pat. No. 8,086,289, which is a continuation of application No. 12/632,359, filed on Dec. 7, 2009, now Pat. No. 7,937,125, which is a continuation of application No. 10/790,479, filed on Mar. 1, 2004, now Pat. No. 7,650,170.

(51) Int. Cl.

| | |
|---|---|
| *G10L 13/00* | (2006.01) |
| *H04M 1/60* | (2006.01) |
| *H04W 4/16* | (2009.01) |
| *H04W 88/06* | (2009.01) |

(52) U.S. Cl.
CPC ..... *H04M 1/7255* (2013.01); *H04M 1/72552* (2013.01); *H04W 4/14* (2013.01); *H04W 4/16* (2013.01); *H04W 88/06* (2013.01)

(58) Field of Classification Search
USPC ............................................ 455/569.1, 575.2
See application file for complete search history.

(56) References Cited

U.S. PATENT DOCUMENTS

| | | | |
|---|---|---|---|
| 5,191,602 A | 3/1993 | Regen et al. ................... 379/58 |
| 5,327,486 A | 7/1994 | Wolff et al. ................ 379/93.23 |
| 5,404,577 A | 4/1995 | Zuckerman et al. ......... 455/66.1 |
| 5,590,417 A | 12/1996 | Rydbeck .................... 455/575.2 |
| 5,724,410 A | 3/1998 | Parvulescu et al. ....... 379/88.18 |
| 5,751,820 A | 5/1998 | Taenzer ....................... 381/312 |
| 5,771,273 A | 6/1998 | McAllister et al. ....... 379/88.01 |
| 5,771,438 A | 6/1998 | Palermo et al. ............. 455/41.1 |
| 5,815,800 A | 9/1998 | Su et al. ...................... 340/7.22 |
| 5,854,984 A | 12/1998 | Buhrmann et al. ......... 455/552.1 |
| 5,890,074 A | 3/1999 | Rydbeck et al. .............. 455/558 |
| 5,913,163 A | 6/1999 | Johansson .................. 455/426.1 |
| 5,915,001 A | 6/1999 | Uppaluru ................... 379/88.22 |
| 5,924,044 A | 7/1999 | Vannatta et al. ............ 455/556.1 |
| 5,928,325 A | 7/1999 | Shaughnessy et al. ....... 709/206 |
| 5,929,774 A | 7/1999 | Charlton ........................ 340/7.1 |
| 5,950,123 A | 9/1999 | Schwelb et al. .............. 455/414 |
| 5,966,643 A | 10/1999 | Radley ......................... 455/74.1 |
| 5,982,904 A | 11/1999 | Eghtesadi et al. ............... 381/74 |
| 6,061,718 A | 5/2000 | Nelson .......................... 709/206 |
| 6,097,806 A | 8/2000 | Baker et al. .............. 379/265.12 |
| 6,112,103 A | 8/2000 | Puthuff .......................... 455/557 |
| 6,144,864 A | 11/2000 | Lands et al. ................ 455/569.1 |
| 6,154,663 A | 11/2000 | Itamochi ..................... 455/569.2 |
| 6,181,956 B1 | 1/2001 | Koskan .......................... 455/566 |
| 6,185,603 B1 | 2/2001 | Henderson et al. ........... 709/206 |
| 6,195,570 B1 | 2/2001 | Ishida ............................ 455/566 |
| 6,212,550 B1 | 4/2001 | Segur ............................ 709/206 |
| 6,223,029 B1 | 4/2001 | Stenman et al. ............... 455/420 |
| 6,272,359 B1 | 8/2001 | Kivela et al. .................. 455/567 |
| 6,337,972 B1 | 1/2002 | Jones et al. ................... 340/7.57 |
| 6,377,823 B1 | 4/2002 | Higuchi et al. ................ 455/567 |
| 6,405,027 B1 | 6/2002 | Bell ............................... 455/403 |
| 6,421,707 B1 | 7/2002 | Miller et al. ................... 709/206 |
| 6,424,251 B1 | 7/2002 | Byrne ............................ 340/7.58 |
| 6,449,343 B1 | 9/2002 | Henderson ................... 379/88.14 |
| 6,470,197 B1 | 10/2002 | Tuoriniemi et al. ........ 455/575.2 |
| 6,549,767 B1 | 4/2003 | Kawashima ................ 455/412.2 |
| 6,577,859 B1 | 6/2003 | Zahavi et al. .............. 455/412.1 |
| 6,597,786 B1 | 7/2003 | Lin ................................. 379/388 |
| 6,600,814 B1 | 7/2003 | Carter et al. ................ 379/88.16 |
| 6,735,453 B1 | 5/2004 | Bobisuthi et al. .......... 455/575.2 |
| 6,745,054 B2 | 6/2004 | Fraccaroli ...................... 455/567 |
| 6,801,793 B1 | 10/2004 | Aarnio et al. .................. 455/566 |
| 6,823,184 B1 | 11/2004 | Nelson .......................... 455/418 |
| 7,020,499 B2 | 3/2006 | Moffi et al. ................. 455/569.1 |
| 7,027,842 B2 | 4/2006 | Zhang et al. .............. 455/569.1 |
| 7,043,436 B1 | 5/2006 | Ryu ............................ 704/270.1 |
| 7,050,834 B2 | 5/2006 | Harwood et al. ............. 455/563 |
| 7,058,578 B2 | 6/2006 | Michelson et al. ........ 704/270.1 |
| 7,072,476 B2 | 7/2006 | White et al. ..................... 381/74 |
| 7,072,686 B1 | 7/2006 | Schrager .................... 455/556.1 |
| 7,095,981 B1 | 8/2006 | Voroba et al. ............... 455/41.2 |
| 7,110,798 B2 | 9/2006 | Nassimi ..................... 455/575.2 |
| 7,177,670 B2 | 2/2007 | Yoon .......................... 455/569.1 |
| 7,280,849 B1 | 10/2007 | Bailey .......................... 455/563 |
| 7,373,182 B2 | 5/2008 | Zatloukal et al. ......... 455/569.1 |
| 7,515,944 B2 | 4/2009 | Zhu et al. ................... 455/569.1 |
| 7,523,035 B2 | 4/2009 | Rokusek et al. .............. 704/260 |
| 8,112,104 B1 | 2/2012 | Thomas et al. ............... 455/466 |
| 9,230,549 B1* | 1/2016 | Popik ...................... G10L 15/30 |
| 2002/0016188 A1 | 2/2002 | Kashiwamura ............... 455/568 |
| 2002/0034956 A1 | 3/2002 | Mekuria ....................... 455/466 |
| 2002/0076073 A1 | 6/2002 | Taenzer et al. ............... 381/315 |
| 2002/0128000 A1 | 9/2002 | do Nascimento, Jr. |
| 2003/0069048 A1 | 4/2003 | Liu et al. ...................... 455/569 |
| 2003/0218642 A1 | 11/2003 | Sakayori et al. ............. 345/853 |
| 2004/0186728 A1 | 9/2004 | Kuboyama et al. .......... 704/276 |
| 2004/0219954 A1 | 11/2004 | Odinak ...................... 455/569.1 |
| 2005/0191994 A1 | 9/2005 | May et al. .................. 455/412.2 |
| 2005/0273330 A1 | 12/2005 | Johnson ........................ 704/246 |
| 2006/0217159 A1 | 9/2006 | Watson .......................... 455/563 |
| 2007/0117549 A1 | 5/2007 | Arnos ......................... 455/414.1 |
| 2007/0173293 A1 | 7/2007 | Tran ............................ 455/569.1 |
| 2007/0184857 A1 | 8/2007 | Pollock et al. ............... 455/466 |
| 2008/0039054 A1 | 2/2008 | Kim ............................ 455/412.2 |
| 2008/0161057 A1 | 7/2008 | Nurminen et al. ........... 455/563 |
| 2009/0318202 A1 | 12/2009 | Bodley ....................... 455/575.2 |
| 2010/0041447 A1* | 2/2010 | Graylin ................... H04M 1/05 |
| | | 455/575.2 |
| 2010/0069007 A1 | 3/2010 | Nagasawa .................... 455/41.3 |
| 2013/0045689 A1* | 2/2013 | Grost ................ H04M 1/72577 |
| | | 455/41.3 |

FOREIGN PATENT DOCUMENTS

| | | | |
|---|---|---|---|
| EP | 1326410 | 7/2003 | .............. H04M 1/60 |
| EP | 1379064 | 1/2004 | ............ H04M 1/725 |
| GB | 2322044 | 2/1997 | .............. H04M 1/27 |
| WO | 99/49681 | 9/1999 | .............. H04Q 7/32 |
| WO | 03/023558 | 3/2003 | |
| WO | 03/026261 | 3/2003 | ............ H04M 1/725 |
| WO | 03/107630 | 12/2003 | .............. H04M 1/00 |

OTHER PUBLICATIONS

Speech Technology Magazine, "Copytalk Unveils New Listen and Reply Service for Email", Jul. 16, 2002. Available at www.speechtechmag.com/cgi-bin/udt/im.display.printable?client_id=speechtechmag, p. 1.

Copytalk LLC, "The Affordable Personal Assistant", 2001-2003. Available at www.copytalk.com/TOPLEVELPAGES/learnmore.htm, pp. 1-2.

Columbia University, "Email Notification Over Telephone—Design Overview", 2002. Available at www.1.cs.columbia.edu/~kns10/ta/summer2002/projects/email2phone, pp. 1-9.

Columbia University, "Email Notification Over Email", 2002. Available at www.1.cs.columbia,edu/~kns10/ta/summer2002/projects/email2phone/report1.html, pp. 1-4.

* cited by examiner

COMMUNICATIONS SYSTEM PROVIDING AUTOMATIC TEXT-TO-SPEECH CONVERSION FEATURES AND RELATED METHODS

FIELD OF THE INVENTION

The present invention relates to the field of communications systems, and, more particularly, to wireless communications networks and related methods.

BACKGROUND OF THE INVENTION

Cellular telephone systems continue to grow in popularity and have become an integral part of both personal and business communications. Cellular phones allow users to place and receive telephone calls most anywhere they travel. Moreover, as cellular telephone technology has increased, so too has the functionality of cellular devices. For example, many cellular devices now incorporate personal digital assistant (PDA) features such as calendars, address books, task lists, etc. Moreover, such multi-function devices may also allow users to wirelessly access electronic mail (email) messages and the Internet via a cellular network.

Of course, cellular telephone usage can be problematic in some situations. In particular, many accidents have occurred because of drivers who become distracted while using their cellular phones. As a result, many drivers use hands-free headsets while driving, which allows the driver to maintain a normal driving posture and both hands on the wheel. Such headsets also allow users to more readily use their phones to place or receive calls while engaging in outdoor activities, such as jogging or bicycle riding, for example.

While headsets work well for telephone calls, they are typically of no value when it comes to accessing email messages on multi-function cellular telephone devices. That is, if a user needs to monitor his email messages while driving or jogging, for example, he still has to look at the display screen of his device to read email message text.

Various approaches have been developed for allowing users to more easily access email messages during such situations. For example, Copytalk, LLC provides a service called Listen and Reply, which uses a text-to-speech converter to convert emails to an audio format so that users can receive their email via telephone, much like a voice mail. Moreover, users may dictate replies over their phones, which are then converted to text email messages and sent to desired recipients. Audio notifications can be filtered by time or sender, and also can be turned on and off from the subscriber's phone.

Despite the advantages of such systems, users may desire greater functionality in some circumstances. Users with multi-function devices that receive text email messages may find it cumbersome to call a service provider whenever they wish to turn audio message delivery on or off. Moreover, users may wish to change their filter parameters fairly regularly or while they are away from their office.

SUMMARY OF THE INVENTION

In view of the foregoing background, it is therefore an object of the present invention to provide a communications network that provides enhanced text-to-speech conversion and delivery features for text (i.e., email) messages and related methods.

This and other objects, features, and advantages in accordance with the present invention are provided by a communications system which may include at least one mobile wireless communications device, and a wireless communications network for sending text messages thereto. More particularly, the at least one mobile wireless communications device may include a wireless transceiver and a controller for cooperating therewith for receiving text messages from the wireless communications network. It may further include a headset output connected to the controller. The controller may be for switching between a normal message mode and an audio message mode based upon a connection between the headset output and a headset. Moreover, when in the audio message mode, the controller may output at least one audio message including speech generated from at least one of the received text messages via the headset output.

Accordingly, the mobile wireless communications device may automatically recognize when the user connects a headset to the headset output and enter the audio message mode based thereon. Thus, the user need not place a call to a message delivery system each time he wishes to turn the system on or off. Nor does the user have to remember to enable the service at his computer before leaving his office. Instead, the user may begin receiving audio messages simply be establishing a connection between his headset and the headset output.

To provide still further user convenience, the headset output may be a wireless headset output for establishing a wireless connection with the headset (e.g., a Bluetooth enabled headset). Of course, the headset output may be a headset jack for a wired headset as well. Moreover, the at least one wireless communications device may further include a user interface device, and the controller may switch to the audio message mode based upon an audio message mode command provided by a user via the user interface device. That is, the user may manually place the controller in the audio message mode, which may be advantageous when the user does not have his headset handy but still wishes to listen to audio messages instead of having to read the corresponding text messages.

To this end, the at least one wireless communications device may include a text-to-speech module for cooperating with the controller to convert the at least one text message to the at least one audio message. Alternately, the controller may generate a conversion request for the at least one text message and cooperate with the wireless transceiver to forward the conversion request to the wireless communications network. The wireless communications network may thus include a text-to-speech module for converting the at least one text message to the at least one audio message based upon the conversion request, and the wireless communications network may then send the at least one audio message to the at least one mobile wireless communications device.

In addition, the at least one mobile wireless communications device may further include a display connected to the controller for displaying the text messages. Also, the wireless communications network may be a cellular network, and the wireless transceiver may be a cellular transceiver, for example.

A method aspect of the invention is for using a mobile wireless communications device including a headset output. The method may include receiving text messages from a wireless communications network, and switching the mobile wireless communications device between a normal message mode and an audio message mode based upon a connection between the headset output and a headset. Furthermore, when in the audio message mode, the mobile wireless communications device may output at least one audio message including speech generated from at least one received text message via the headset output.

A mobile wireless communications device, such as the one described briefly above, as well as a related computer-readable medium are also provided.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
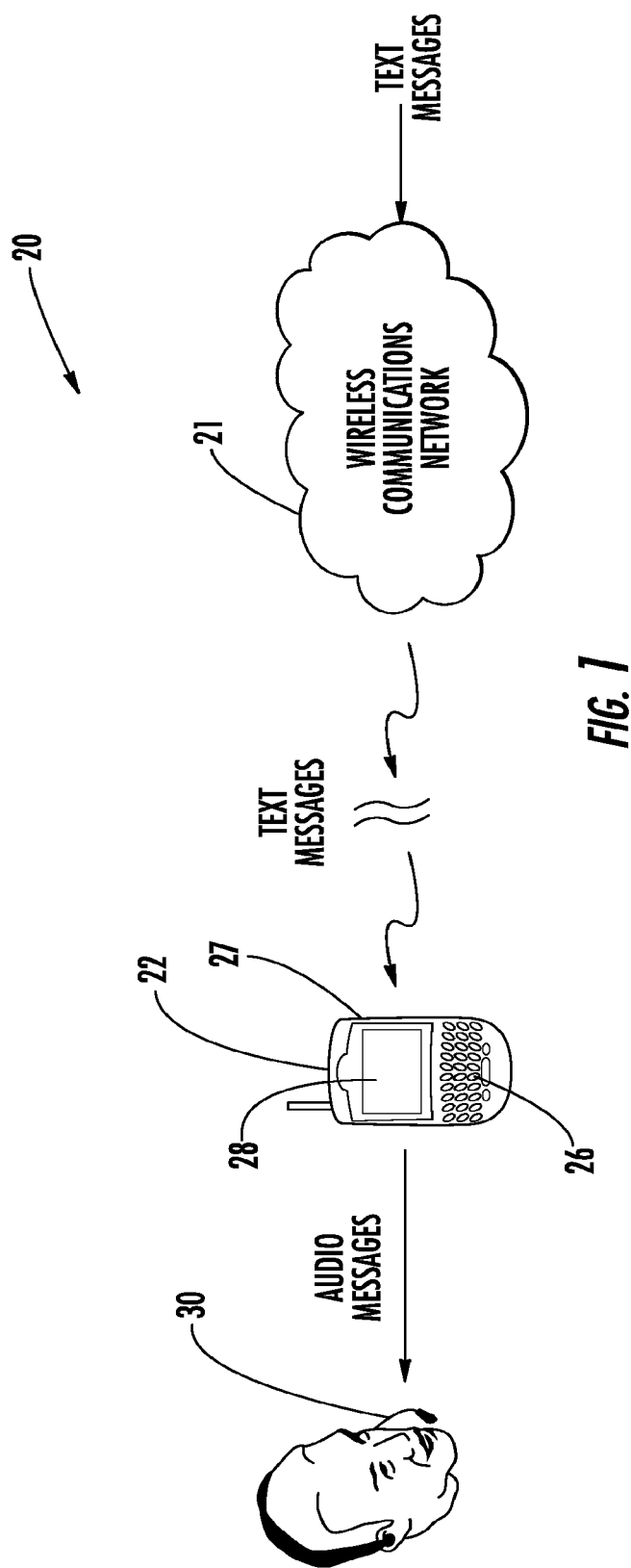
FIG. 1 is a schematic block diagram generally illustrating a communications system in accordance with the present invention.
Figure 2:
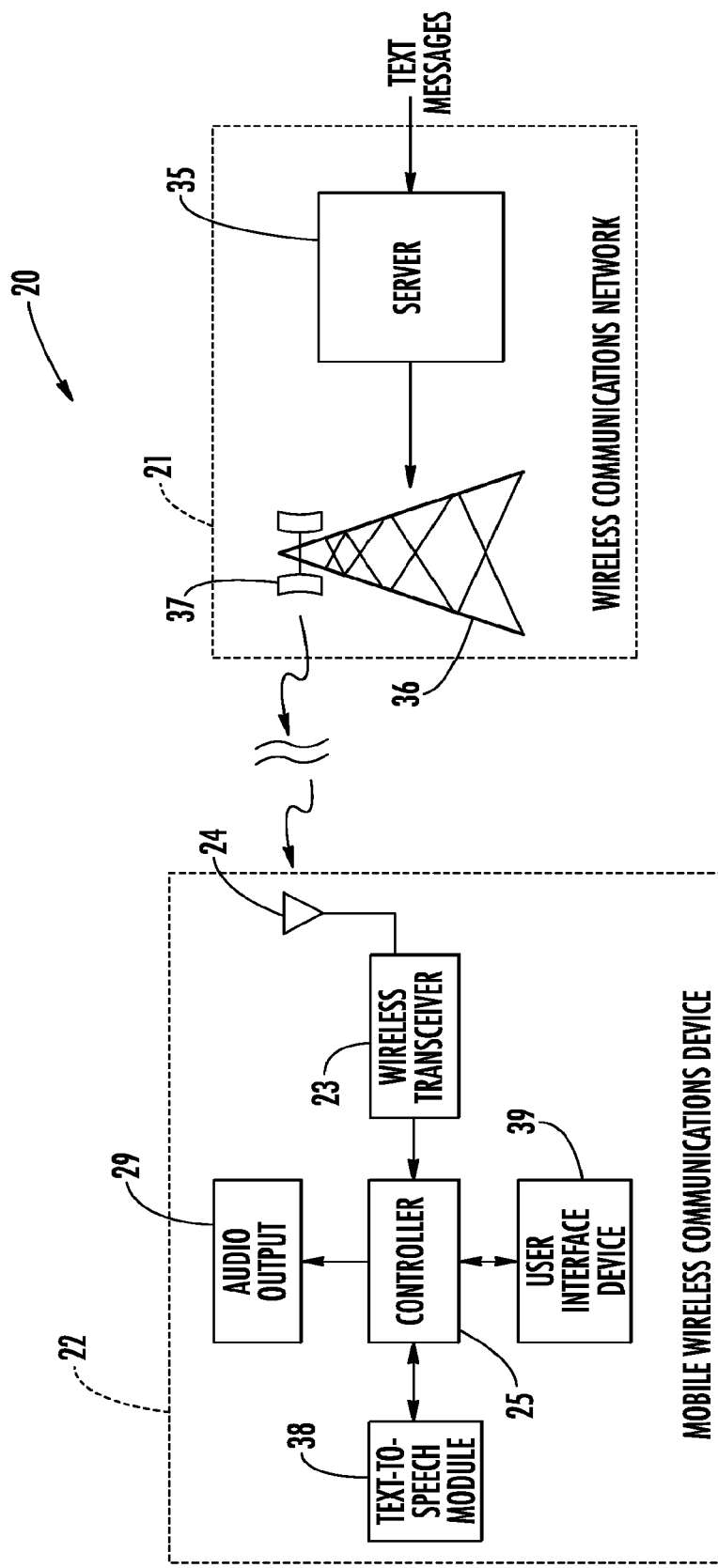
FIG. 2 is a schematic block diagram illustrating an embodiment of the communications system of FIG. 1 in greater detail.

Referring initially to FIGS. 1 and 2, a communications system 20 in accordance with the present invention illustratively includes a wireless communications network 21 and one or more mobile wireless communications devices 22 for communicating therewith. In the illustrated example, the mobile wireless communications device 22 is a Blackberry device. However, it will be appreciated that numerous other types of wireless (e.g., cellular) devices may be used in accordance with the present invention as well. Moreover, while only a single device 22 is shown for clarity of illustration, it will further be appreciated that numerous mobile wireless communications devices may be used.

In particular, the mobile wireless communications device 22 illustratively includes a wireless transceiver 23 and associated antenna 24, and a controller 25 connected to the wireless transceiver. By way of example, the controller 25 may be a microprocessor or other suitable control circuitry with associated memory, as will be discussed further with reference to Example 1, below.

The mobile wireless communications device 22 further illustratively includes a user interface device 39 connected to the controller 25. Among other functions, the user interface device 39 allows a user to enter one or more audio message filter parameters, as will be described further below. In the case of the illustrated Blackberry device, the user interface device 39 includes a keypad 26 and/or a trackwheel 27. Of course, other user interface devices 39 may be used as well, such as touch screens, etc., as will be appreciated by those skilled in the art. The mobile wireless communications device 22 also illustratively includes a display 28 and an audio output 29, such as a headset output for a headset 30, for example, both of which are connected to the controller 25.

In the present example, the wireless communications network 21 is a cellular communications network which illustratively includes a server 35, such as an electronic mail (email) server for receiving text messages for the user of the mobile wireless communications device 22. Furthermore, a base station 36, which is illustratively represented as a cellular tower, is connected to the server 35 and has an associated antenna 37 and transceiver (not shown), as will be appreciated by those skilled in the art. In the case of a cellular network, the wireless transceiver 23 of the mobile wireless communications device will correspondingly be a cellular transceiver. Various cellular formats and or protocols may be used in accordance with the present invention, as will be discussed further below.

The wireless communications network 21 may further include the appropriate switching and control circuitry for routing telephone calls to and from the mobile wireless communications device 22, as will also be appreciated by those skilled in the art. However, this circuitry is not shown for clarity of illustration.

During normal operations, the server 35 receives text messages (e.g., email messages) for delivery to the mobile wireless communications device 22 via the Internet, for example, as will be appreciated by those skilled in the art. The server 35 then cooperates with the base station 36 to send the text messages to the mobile wireless communications device 22, as will also be appreciated by those skilled in the art. The controller 25 similarly cooperates with the wireless transceiver 23 to receive the text messages from the wireless communications network 21. Moreover, the controller 25 may then cause the display 28 to display an indication that new text messages have arrived, and/or display the messages themselves.

If the user is not otherwise preoccupied, he can turn his attention to the display 28 and use the keypad 26 and/or other input devices (e.g., trackwheel 27, touch screen, etc.) to scroll through the message, forward the message, prepare a reply thereto, etc. On the other hand, if the user is engaged in an activity such as driving, jogging, etc., where it is inconvenient or impractical to focus attention on the display 28 and use the keypad 26, the user may prefer that certain text messages be converted to speech and played for the user, similar to a voice mail message.

In accordance with the present invention, the user may provide one or more audio message filter parameters for filtering the text messages via the user interface device (i.e., the keypad 26 and/or trackwheel 27). That is, the filter parameters are used by the controller 25 for "filtering" out the text messages that are to be converted to audio (i.e., speech) messages. By using the user interface device 39, the user may quickly and easily set and change the audio message filter parameters, and may advantageously do so while away from his home or office computer.

Figure 4:
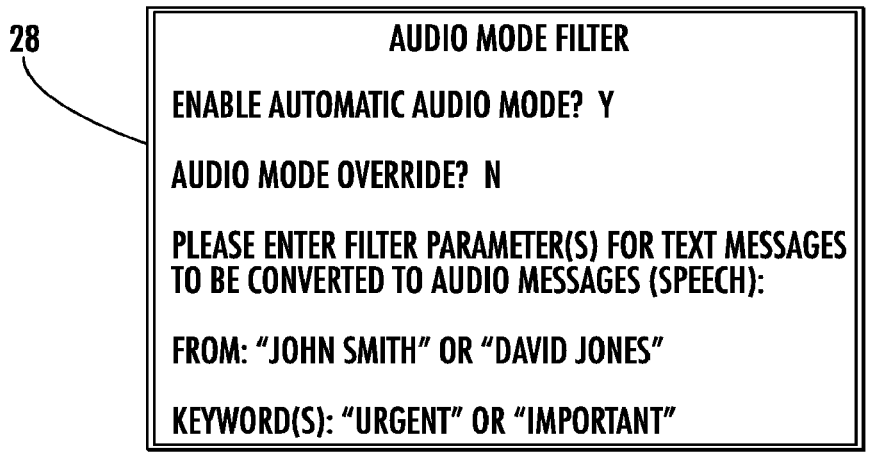
FIG. 4 is a front view of the display screen of the mobile wireless communications device illustrated in FIG. 1 illustrating audio message mode and filter parameter selection features of the present invention.

As illustrated in FIG. 4, various audio message filter parameters may be used. For example, one such parameter may be the name (e.g., "John Smith" or "David Jones") or other identifier (e.g., an email address or portions thereof) of the message sender. Another example would be one or more keywords (e.g., "urgent" or "important") in the subject or body of the message. Various other filter parameters may be used as well, such as recipient information in a "cc" field, time/date, a message priority setting, etc., as will be appreciated by those skilled in the art.

Of course, while the user could provide no filter parameters and thus allow all text messages to be converted to speech, this will typically be undesirable. This is because a user will most likely not want to have "junk" email messages read to them, especially when they are driving or jogging, for example. Indeed, users will likely only want to receive important (e.g., from their boss, a client, etc.) or otherwise urgent messages while driving, exercising, etc., and leave more routine messages for a later time.

Another reason filter parameters are likely to be used relates to the embodiment illustrated in FIG. 3 (discussed further below) where audio message conversion is performed by the wireless communications network 21'. In such case, a significant amount of airtime minutes could be used up by transmitting an audio file for each text message a user receives, as will be appreciated by those skilled in the art.

Once the controller 25 receives the audio message filter parameter(s) from the user, the parameter(s) is stored in a memory (see FIG. 7) for later use when the controller is placed in the audio message mode. The controller 25 may be placed in the audio message mode in various ways. For example, the controller 25 may enter the audio message mode based upon a connection to the audio output 29, such as if the audio output is a headset output and is connected to a headset 30.

More specifically, the controller 25 may automatically detect this connection and enter the audio message mode, as will be appreciated by those skilled in the art. It should be noted that this connection may be a physical connection (i.e., in the case of wired headphones), or a wireless connection (i.e., in the case of wireless headphones), as will be discussed further below. Further, this automatic audio mode may be selectively turned on or off by the user via the user interface device 39 as shown in FIG. 4. Because the controller 25 may advantageously enter the audio message mode whenever the user connects his headset 30 to the output 29, the user does not have to remember to enable the audio message mode when leaving his office, or place a call to an audio message delivery system to disable or resume the audio message mode.

Additionally, a manual or override setting may also be used to place the controller 25 in the audio message mode indefinitely, whether a connection to the headset 30 is present or not. The override mode may be advantageous when the user is not carrying the headset 30, but still wishes to have selected text messages converted to speech and read like a voice message, even if the user has to hold the mobile wireless communications device 22 to his ear. The user may quickly and conveniently turn the override and/or automatic audio modes on and off using the user interface 26, as seen in FIG. 4.

Various approaches may also be used for converting the selected text messages to audio messages. In the example illustrated in FIG. 2, the mobile wireless communications device 22 illustratively includes a text-to-speech module 38 for cooperating with the controller 25 to convert the selected text messages to the audio messages. By way of example, the text-to-speech module 38 may be a software module that is run by the controller 25 when needed. Various text-to-speech conversion modules, which are known to those skilled in the art, may be used in accordance with the present invention.

Figure 3:
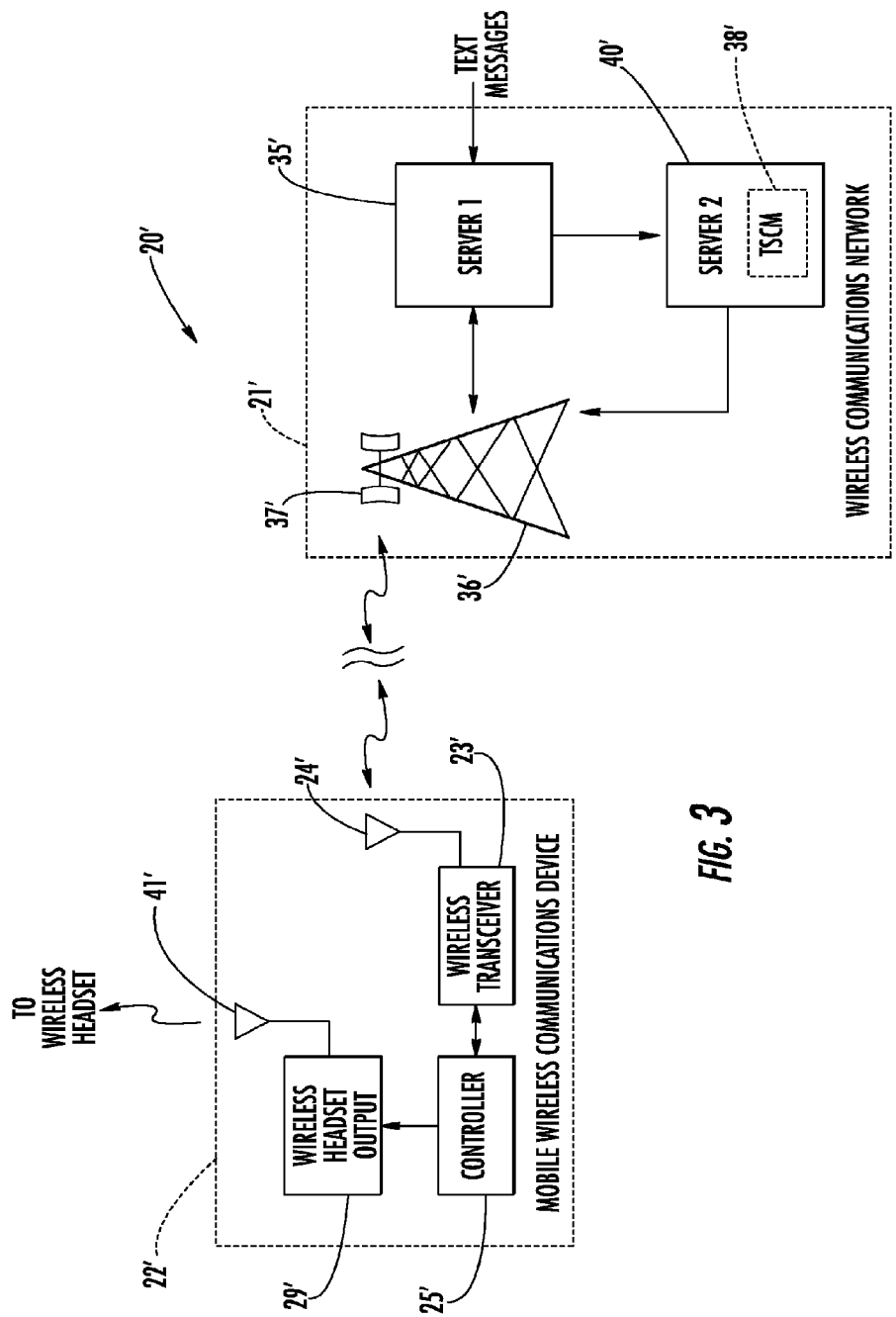
FIG. 3 is a schematic block diagram illustrating another embodiment of the communications system of FIG. 1 in greater detail.

Turning more specifically to FIG. 3, an alternate approach for performing text-to-speech conversion is now described. In this exemplary embodiment, the text-to-speech module resides in the wireless communications network 21'. Thus, instead of converting the text messages to speech at the mobile wireless communications device 22', the controller 25' instead generates conversion requests for the selected text messages, and cooperates with the wireless transceiver 23' to forward the conversion requests to the wireless communications network 21'.

In the illustrated example, the text-to-speech conversion module 38' is implemented on a dedicated text-to-speech conversion server 40'. This approach may advantageously help prevent the workload of the email server 35' from becoming unmanageable, as will be appreciated by those skilled in the art. However, it will also be appreciated that the email and speech conversion functions could be consolidated on a single server, or spread to more than two severs, depending upon the given implementation.

Generally speaking, the text-to-speech server 40' may include the requisite text-to speech conversion software module 38', the appropriate telephony circuitry (not shown) for calling users and playing the audio messages, and an interface software module for interfacing the conversion software, telephony circuitry, and the email server 35', as will be appreciated by those skilled in the art. That is, once the email server 35' learns that a particular text message is to be converted to speech, it may instruct the text-to-speech conversion server 40' accordingly and hand the process over thereto, as the text-to-speech conversion server can perform the appropriate telephone connection operations to send the speech message to the user without further intervention or supervision.

Typically, the server 35' will host a mailbox for storing a user's text (i.e., email) messages, which are retained for a certain period of time. For purposes of identifying the message stored in the mailbox that is to be converted to an audio format, the server 35' may generate a unique identification thereof which is transmitted with the text message to the mobile wireless communications device 22'. The controller 25' may then include the unique identification in the conversion request for the respective text message. Of course, various identifiers may be used for this purpose, such as the date and time the message is first received by the server 35 or sent to the mobile wireless communications device 22, etc.

Once the selected text message has been converted to a speech message in an audio format, such as a .wav file, for example, the server 40' cooperates with the base station 36' to send the audio message to the mobile wireless communications device 22'. The controller 25' once again cooperates with the wireless transceiver 23' for receiving the audio messages, and it outputs the audio messages via the output 29'.

It should be noted that mobile wireless communications devices often include a subscriber identity modules (SIMs), which store the cellular telephone number assigned to the user, as well as other information (e.g., personal phone numbers, text messages, information used to support other services, etc.). As such, since SIMs may be interchanged between different devices, it may be desirable for the controller 25' to provide the user's phone number stored in the SIM (if present) when establishing communications with the wireless communications network 21'. This allows the server 40' to maintain the correct phone number for the device at all times.

In the illustrated example, the output 29' is a wireless headset output for communicating with a wireless headset and has an antenna 41' associated therewith. By way of example, such a wireless headset output may be a Bluetooth enabled output, for example, although other wireless communication formats may also be used, as will be appreciated by those skilled in the art. Of course, the output 29 may be a headset jack for a wired headset as well.

Figure 5:
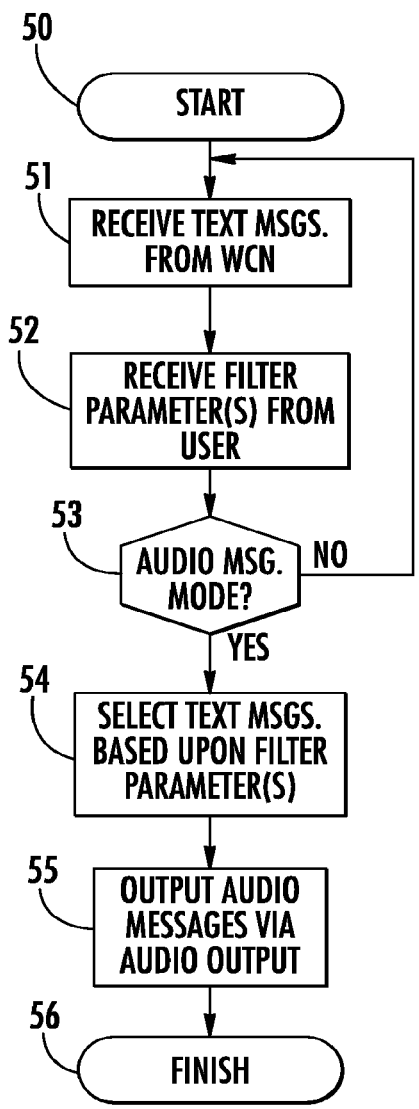
FIGS. 5 and 6 are flow diagrams illustrating communications method aspects of the present invention.

A first method aspect of the invention for using a mobile wireless communications device 22 including a user interface device 39 and an audio output 29 is now described with reference to FIG. 5. As noted above, the mobile wireless communications device 22 (i.e., the controller 25) is switchable between a normal message mode and an audio message mode. The method begins, at Block 50, with the mobile wireless communications device 22 receiving text messages from a wireless communications network 21, at Block 51, and receiving at least one audio mode filter parameter from a user via the user interface device 39, at Block 52. Furthermore, when in the audio message mode (Block 53), the mobile wireless communications device 22 selects received text messages based upon the at least one audio mode filter parameter, at Block 54. Audio messages including speech generated from the selected text messages are then output via the audio output 29, at Block 55, as discussed further above, thus concluding the illustrated method (Block 56).

Figure 6:
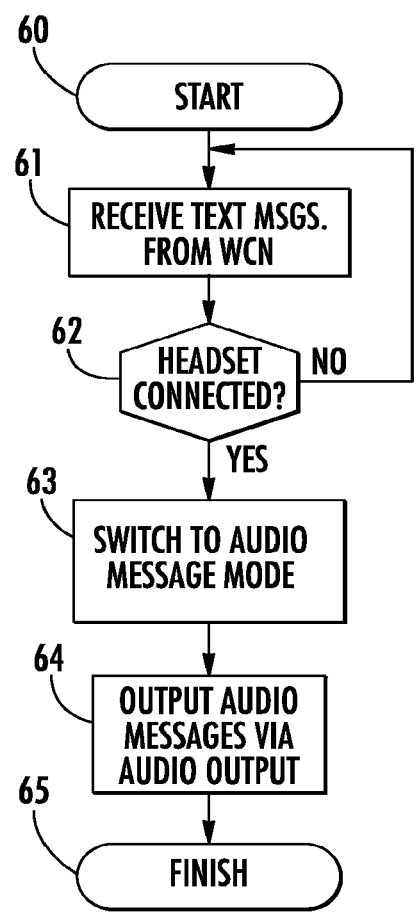

Another method aspect of the invention for using a mobile wireless communications device 22' including a headset output 29' is now described with reference to FIG. 6. The method begins (Block 60) with receiving text messages from a wireless communications network 21', at Block 61. The mobile wireless communications device 22' switches between a normal message mode and an audio message mode based upon a connection between the headset output 29' and a headset 30', at Block 62 and 63, as described above. As also noted above, when in the audio message mode, the mobile wireless communications device outputs 22' audio messages including speech generated from the received text messages via the headset output 29', at Block 64, thus concluding the illustrated method.

The present invention will be further understood with reference to an exemplary implementation thereof using a Blackberry device, which is set forth in Example 1 below, as well as with reference to an exemplary Blackberry device, which is described further in Example 2 below.

Example 1

An executive is awaiting an email regarding an important issue from the CEO of his company. He sets an audio message filter parameter indicating that all emails from the CEO joe@somecompany.com will need to be provided via audio (i.e., speech). He commutes one hour to work everyday. Before he starts his commute he sets the device to be in the audio message mode, or the device automatically switches to this mode when he connects a headset (e.g., a Bluetooth enabled headset). Thirty minutes into the commute he receives an email from the CEO. The Blackberry Enterprise Server checks the device filters and sees that this email is subject to audio (i.e., speech) conversion and sends the request to a text-to-speech server.

This server looks up the phone number for the device, and converts the text of the email to speech in a .wav file. It then places a call to the device and plays the .wav file. The device can be set to have unique ring tones when an incoming call is from the text-to-speech server, for example. The user can configure the Blackberry to either have the device auto answer or use the headset to answer and listen to the email.

Example 2

Figure 7:
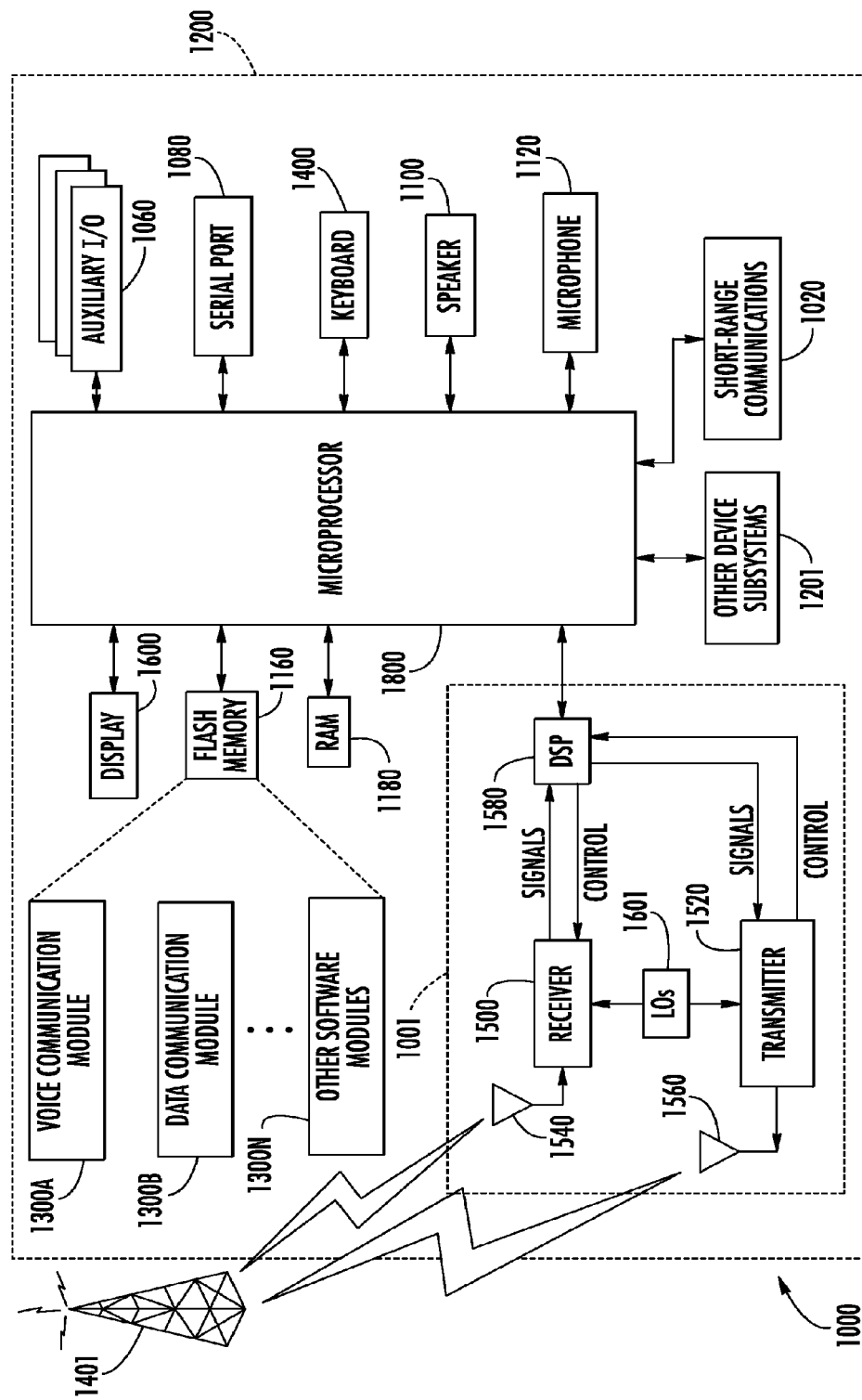
FIG. 7 is a schematic block diagram of an exemplary mobile wireless communications device suitable for use with the present invention.

Turning now additionally to FIG. 7, an exemplary handheld mobile wireless communications device 1000 (i.e., a Blackberry device) that can be used in accordance with the present invention is now described. The device 1000 illustratively includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

In addition to the processing device 1800, other parts of the mobile device 1000 include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for using a wireless communications device comprising a headset output, the method comprising:
   determining at least one filtered received text message based upon a sender's identity;
   switching the wireless communications device to a hands-free audio message mode based upon determining establishment of a headset connection; and
   when in the hands-free audio message mode, outputting at least one audio message comprising speech generated from the at least one filtered received text message via said headset output; and
   displaying the at least one filtered received text message on a display of the wireless communications device.

2. The method of claim 1, wherein said headset output comprises a wireless headset output.

3. The method of claim 1, wherein said headset output comprises a wired headset output.

4. The method of claim 1, further comprising switching to a normal mode based upon determining disconnection of the headset connection.

5. The method of claim 4, further comprising switching to the hands-free audio message mode based upon an audio message mode command provided via a user interface device.

6. The method of claim 1, further comprising converting the at least one filtered received text message to the at least one audio message.

7. A non-transitory computer readable medium comprising computer instructions which, when executed by a controller of a wireless communications device having a headset output, cause the wireless communications device to perform a method comprising:
   determining at least one filtered received text message based upon a sender's identity;
   switching the wireless communications device to a hands-free audio message mode based upon determining establishment of a headset connection; and
   when in the hands-free audio message mode, outputting at least one audio message comprising speech generated from the at least one filtered received text message via said headset output; and
   displaying the at least one filtered received text message on a display of the wireless communications device.

8. The non-transitory computer readable medium of claim 7, wherein said headset output comprises a wireless headset output.

9. The non-transitory computer readable medium of claim 7, wherein said headset output comprises a wired headset output.

10. The non-transitory computer readable medium of claim 7, further comprising computer instructions for switching to a normal mode based upon determining disconnection of the headset connection.

11. The non-transitory computer readable medium of claim 10, further comprising computer instructions for switching to the hands-free audio message mode based upon an audio message mode command provided via a user interface device.

12. The computer instructions of claim 7, further comprising computer instructions for converting the at least one filtered received text message to the at least one audio message.

13. A non-transitory computer readable medium comprising computer instructions which, when executed by a controller of a wireless communications device having a headset output, cause the wireless communications device to perform a method comprising:
   determining at least one filtered received text message based upon at least one audio message filter parameter;
   switching the wireless communications device to a hands-free audio message mode based upon determining establishment of a connection with the headset output; and
   when the wireless communications device is in the hands-free audio message mode, outputting at least one audio message comprising speech generated from the at least one filtered received text message via the headset output.

14. The non-transitory computer readable medium of claim 13, wherein the at least one audio message filter parameter is based upon a sender's identity.

15. The non-transitory computer readable medium of claim 13, wherein the at least one audio message filter parameter comprises at least one of a sender's name, a sender's address, a keyword, a message priority, a time or date, or a copied person's identity.

16. The non-transitory computer readable medium of claim 13, wherein the headset output comprises a wireless headset output.

17. The non-transitory computer readable medium of claim 13, wherein the headset output comprises a wired headset output.

18. The non-transitory computer readable medium of claim 13, further comprising computer instructions for switching to a normal mode based upon determining disconnection of the headset connection.

19. The non-transitory computer readable medium of claim 18, further comprising computer instructions for switching to the hands-free audio message mode based upon an audio message mode command provided via a user interface device.

20. The non-transitory computer readable medium of claim 13 further comprising computer instructions for converting the at least one filtered received text message to the at least one audio message prior to outputting.

\* \* \* \* \*